United States Patent
Zhang

(10) Patent No.: US 7,610,691 B2
(45) Date of Patent: Nov. 3, 2009

(54) TESTING APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 43 days.

(21) Appl. No.: 12/101,135

(22) Filed: Apr. 10, 2008

(65) Prior Publication Data

US 2009/0158607 A1    Jun. 25, 2009

(30) Foreign Application Priority Data

Dec. 19, 2007    (CN) .................... 2007 1 0203209

(51) Int. Cl.
*G01B 5/18* (2006.01)
(52) U.S. Cl. .......................... 33/836; 33/542
(58) Field of Classification Search ............... 33/542, 33/542.1, 832, 833, 836, 613, 645
See application file for complete search history.

(56) References Cited

U.S. PATENT DOCUMENTS

| | | | |
|---|---|---|---|
| 5,497,560 A * | 3/1996 | Pasquerella et al. ........... 33/836 |
| 7,096,594 B2 * | 8/2006 | Erickson et al. ............... 33/645 |
| 2004/0163265 A1 * | 8/2004 | Helms .......................... 33/286 |
| 2004/0261281 A1 * | 12/2004 | Erickson et al. ............... 33/645 |
| 2009/0094851 A1 * | 4/2009 | Xiao et al. ..................... 33/832 |
| 2009/0126215 A1 * | 5/2009 | Rattunde ....................... 33/832 |

* cited by examiner

*Primary Examiner*—G. Bradley Bennett
(74) *Attorney, Agent, or Firm*—Frank R. Niranjan

(57) ABSTRACT

A testing apparatus for testing a depth of a server chassis includes a testing frame configured for being received and secured in the server chassis, a testing unit, a signal processing member and an indicating member. The test unit includes a testing pole telescopingly retained in a rear wall of the frame, a pair of first and second contacting members spaced apart with a distance in accordance with the desired depth range, and a trigger member secured to the testing pole and moving with the testing pole to contact with the first or second contacting members or neither of them. The signal processing member and the indicating member are mounted on the frame. The testing unit, the signal processing member and the indicating member are correspondingly electrically connected.

8 Claims, 7 Drawing Sheets

US 7,610,691 B2

TESTING APPARATUS

BACKGROUND

1. Field of the Invention

The present invention relates to testing apparatuses. Particularly, the present invention relates to a testing apparatus for testing a depth of a server chassis.

2. Description of Related Art

A blade server typically includes a server chassis with a plurality of connectors mounted on a rear end thereof, and a plurality of blades received in the server chassis. Each blade includes at least one connector arranged for electrically connecting with the corresponding connector of the server chassis. The depth of the server chassis influences the connecting status of the corresponding connectors. If the depth is too great, the connection between the connectors is not secure. If the depth is too little, the connectors may easily be destroyed due to excessive impact from pushing the blade into the server chassis.

However, when manufacturing the server chassis, the depth of the server chassis is typically tested with a real blade inserted in the server chassis to connect the corresponding connectors with each other. Next, an operator determines whether the corresponding connectors are properly connected or not according to the operator's sense and experience, thereby concluding whether the server chassis is qualified or not. Subsequently, the testing result is uncertain, creating an industry need for a testing apparatus capable of automatically detecting the depth of the server chassis.

SUMMARY

An exemplary testing apparatus for testing a depth of a server chassis includes a testing frame configured for being received and secured in the server chassis, a testing unit, a signal processing member and an indicating member. The test unit includes a testing pole telescopingly retained in a rear wall of the frame, a pair of contacting members spaced apart with a distance in accordance with the desired depth range, and a trigger member secured to and moving with the testing pole and possibly making contact with the first or second contacting members. The signal processing member and the indicating member are mounted on the frame. The signal processing member is electrically connected to the test unit for sending a signal based on connection status between trigger member and the contact poles. The indicating member is electrically connected to the signal processing member to indicate the testing result according to the signal.

Other advantages and novel features of the present angle testing apparatus will become more apparent from the following detailed description of preferred embodiment when taken in conjunction with the accompanying drawings, in which:

DETAILED DESCRIPTION

Figure 1:
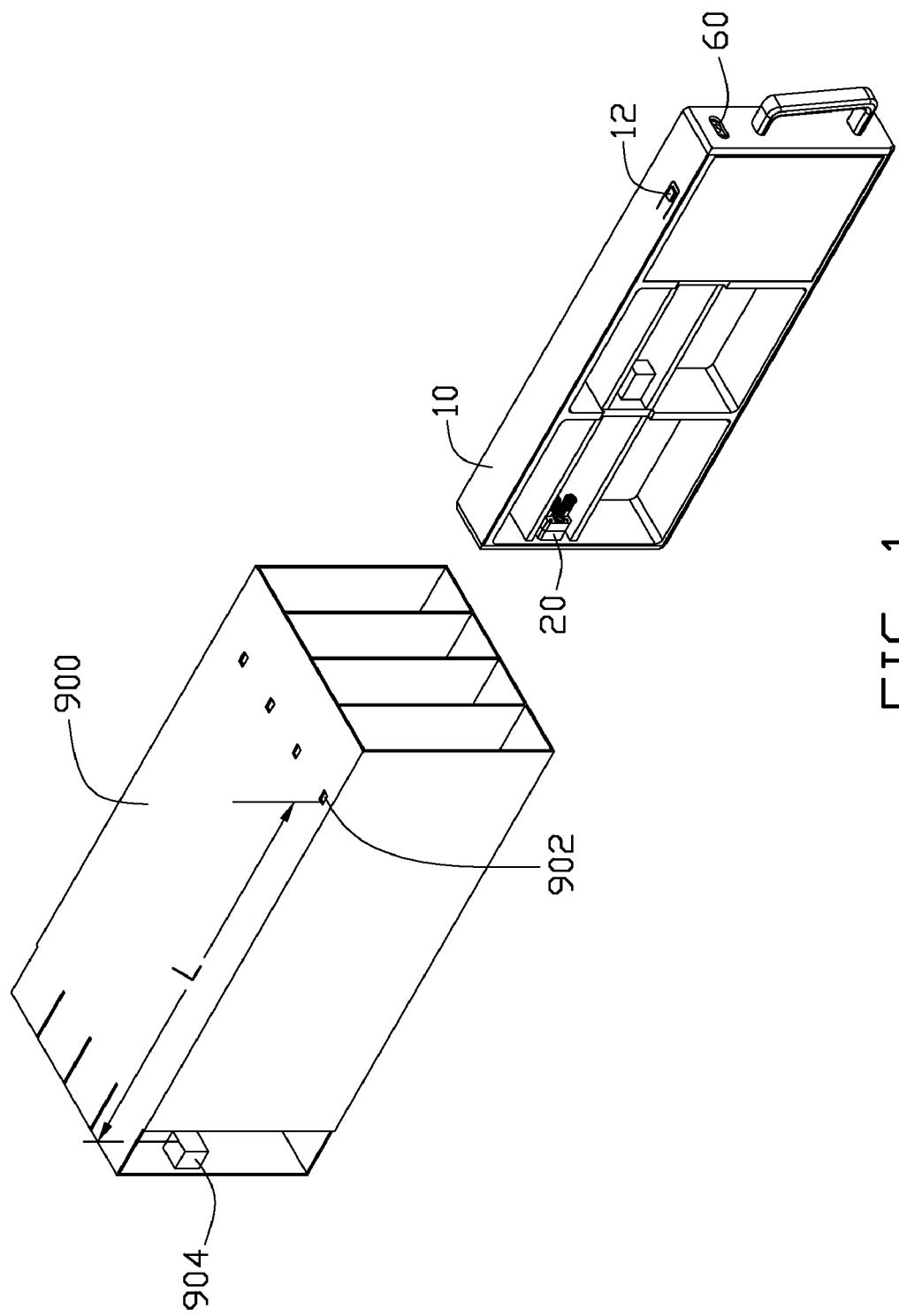
FIG. 1 is an assembled, isometric view of a testing apparatus in accordance with an embodiment of the present invention, together with a server chassis to be tested.
Figure 2:
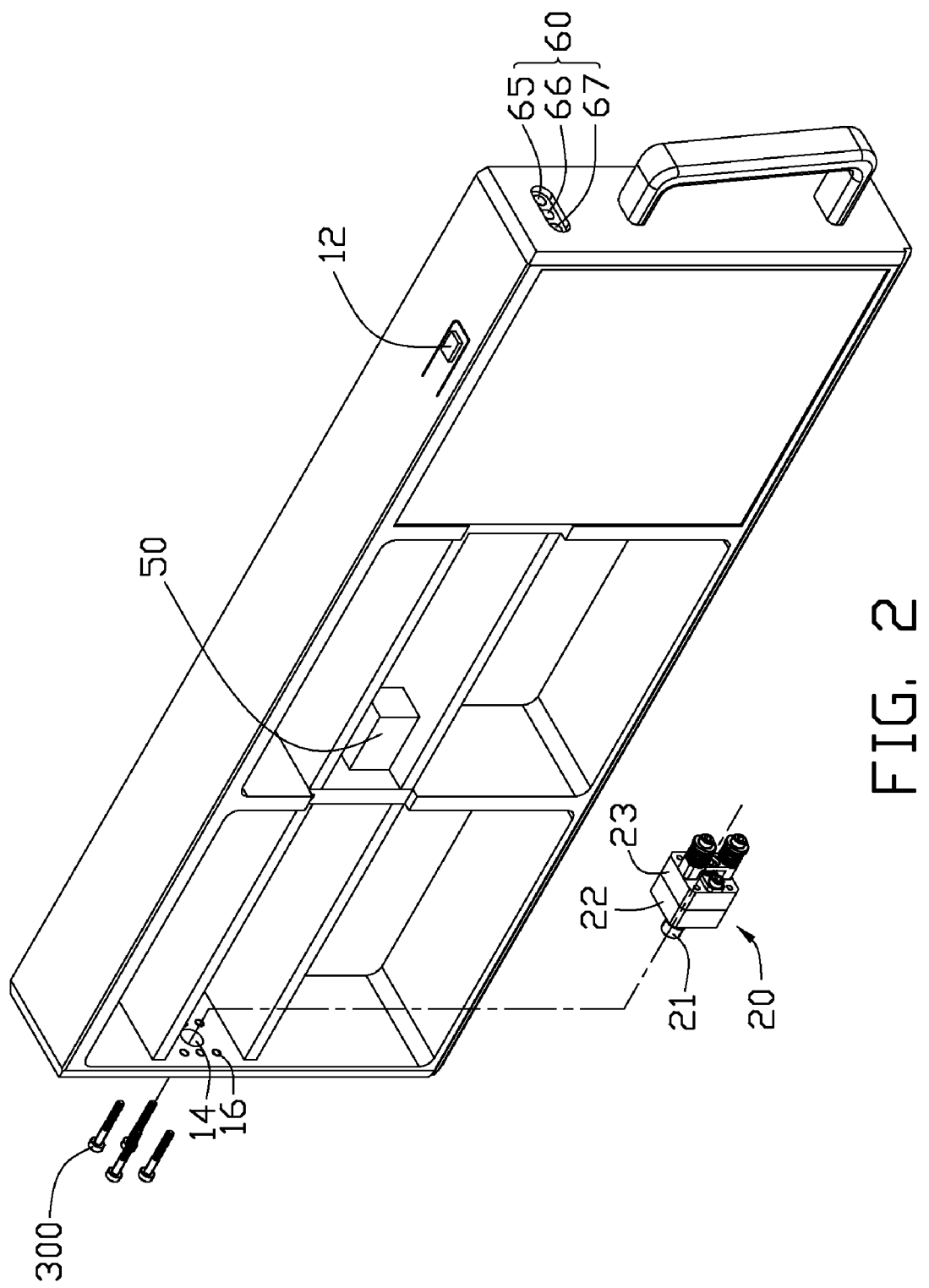
FIG. 2 is an exploded view of the testing apparatus of FIG. 1.

Referring to FIGS. 1 and 2, a testing apparatus provided for testing a depth of a server chassis 900 in accordance with an embodiment of the present invention includes a frame 10, a testing unit 20, a signal processing member 50 and an indicating member 60. The testing unit 20, the signal processing member 50 and the indicating member 60 are electrically coupled together and respectively attached to the frame 10. A plurality of receiving spaces is defined in the server chassis 900 for receiving a plurality of blades, correspondingly. A plurality of locking holes 902 is respectively defined in top and bottom walls of the server chassis 900. A plurality of connectors 904 extends from a backplane attached to a rear of the server chassis 900. A distance L from each locking hole 902 to the corresponding connector 904 represents a depth of the server chassis 900 to be tested.

The frame 10 includes a pair of locking portions 12 respectively formed on top and bottom walls thereof corresponding to the locking holes 902 of the server chassis 900. A through hole 14 and a plurality of locating holes 16 arranged around the through hole 14 are defined in a rear wall of the frame 10. The indicating member 60 is defined in a front wall of the frame 10 and includes three lights 65, 66 and 67 with different colors.

Figure 3:
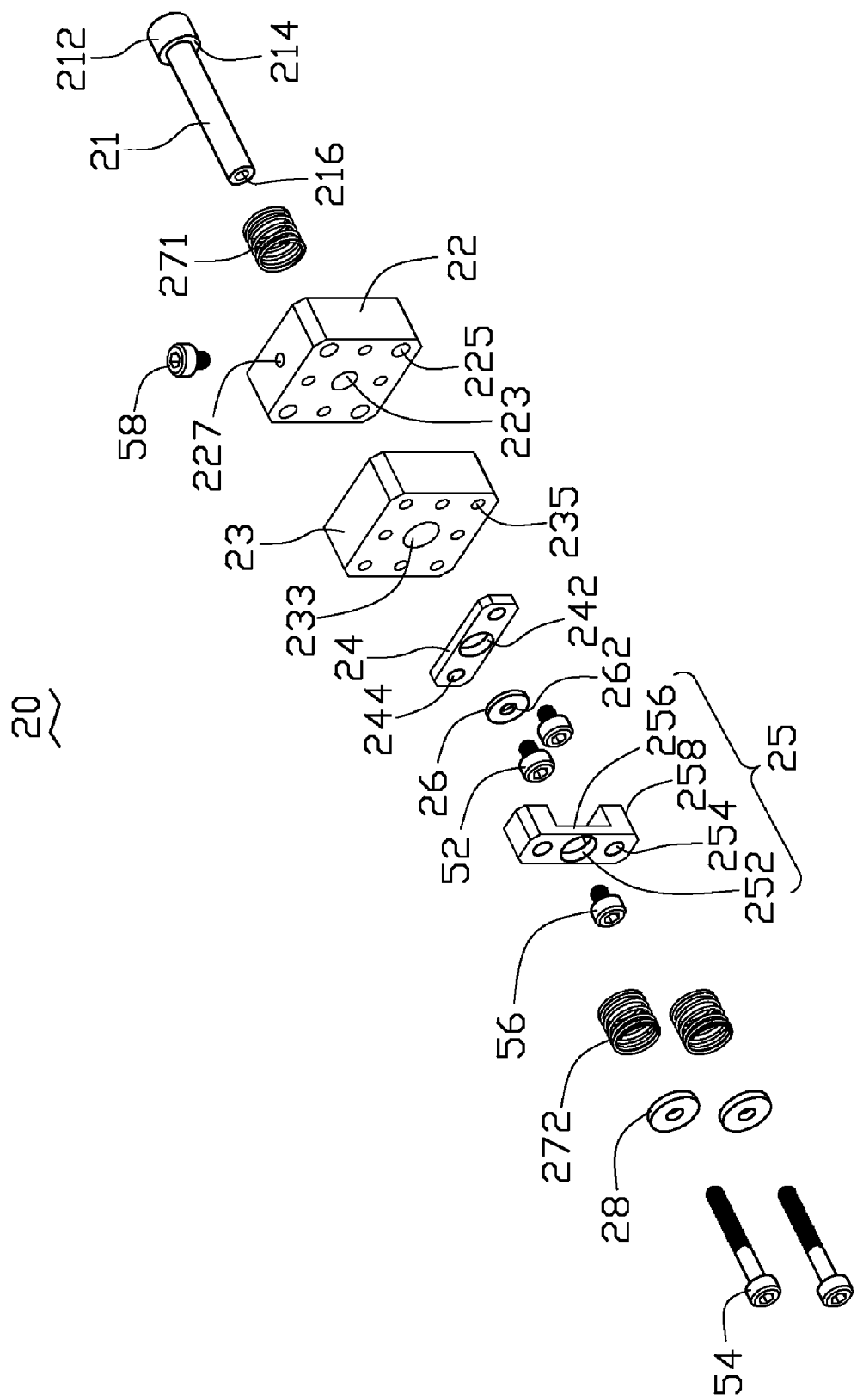
FIG. 3 is an exploded view of a testing unit of the testing apparatus of FIG. 2.

Referring also to FIG. 3, the testing unit 20 includes a testing pole 21, a first mounting block 22 secured to the rear wall of the frame 10, a second mounting block 23 secured to the first mounting block 22, a first contacting member 24 secured to the second mounting block 23, a second contacting member 25 secured to the second mounting block 23 and spaced from the first contacting member 24, a round trigger member 26 secured to a rear end of the testing pole 21, a coil spring 271, a pair of coil springs 272, and a pair of pads 28. The second mounting block 23 is made from dielectric material. A head 212 is formed at a front end of the testing pole 21. A shoulder is formed between the testing pole 21 and the head 212. A screw hole 216 is defined in a rear end of the testing pole 21. A through hole 223 and a plurality of installing holes 225 arranged around the through hole 223 are defined through a front surface of the first mounting block 22 and a rear surface thereof. A screw hole 227 is defined in a top surface of the first mounting block 22. A through hole 233 and a plurality of screw holes 235 arranged around the through hole 233 are defined through a front surface of the second mounting block 23 and a rear surface thereof. The first contacting member 24 defines a through hole 242 and a pair of installing holes 244 respectively arranged at opposite sides of the through hole 242. The second contacting member 25 includes a contacting portion 256 and a pair of locating portions 258 respectively perpendicularly extending from opposite ends of the contacting portion 256. A through hole 252 having a radius less than that of the trigger member 26 is defined in the contacting portion 256. A pair of installing holes 254 is respectively defined in the locating portions 258. An installing hole 262 is centrally defined in the trigger member 26.

Figure 4:
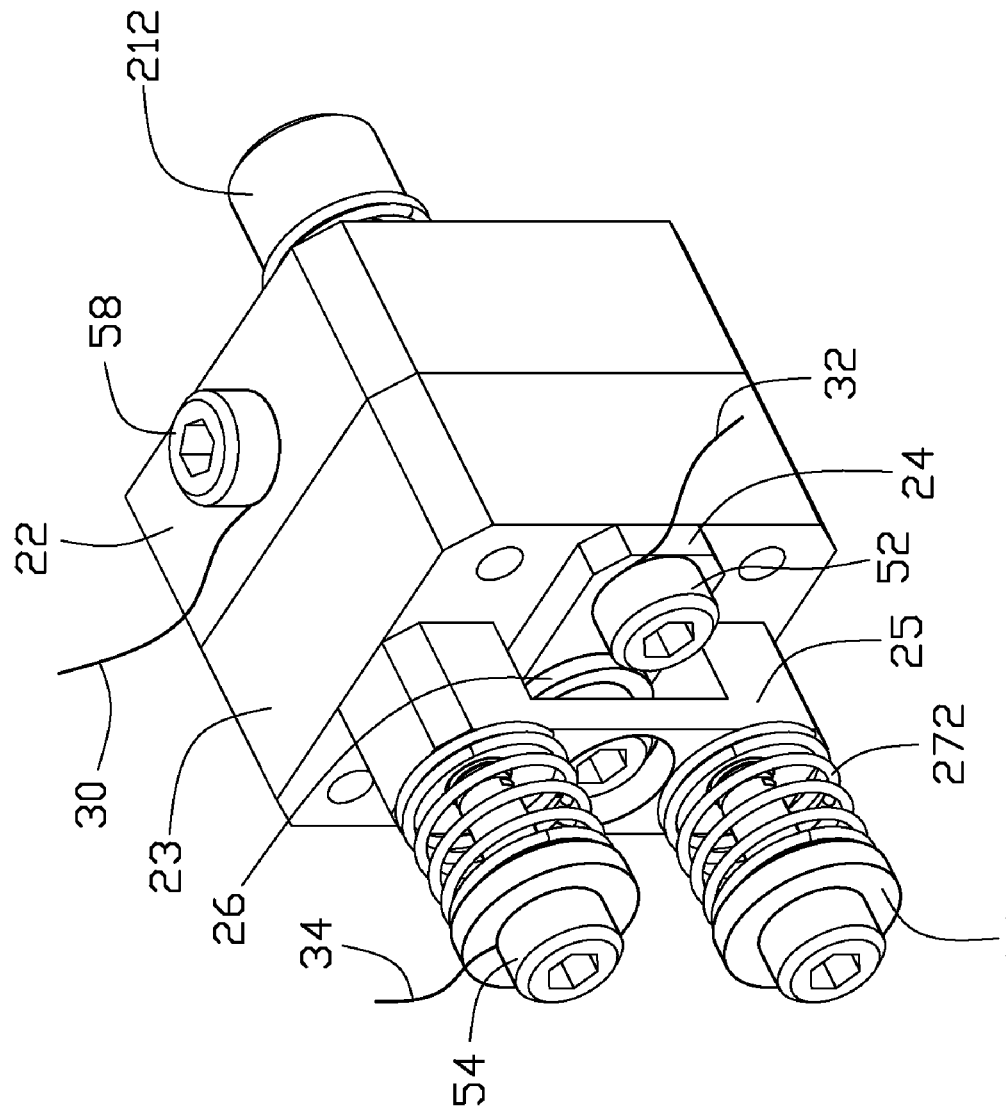
FIG. 4 is an assembled view of FIG. 3.
Figure 5:
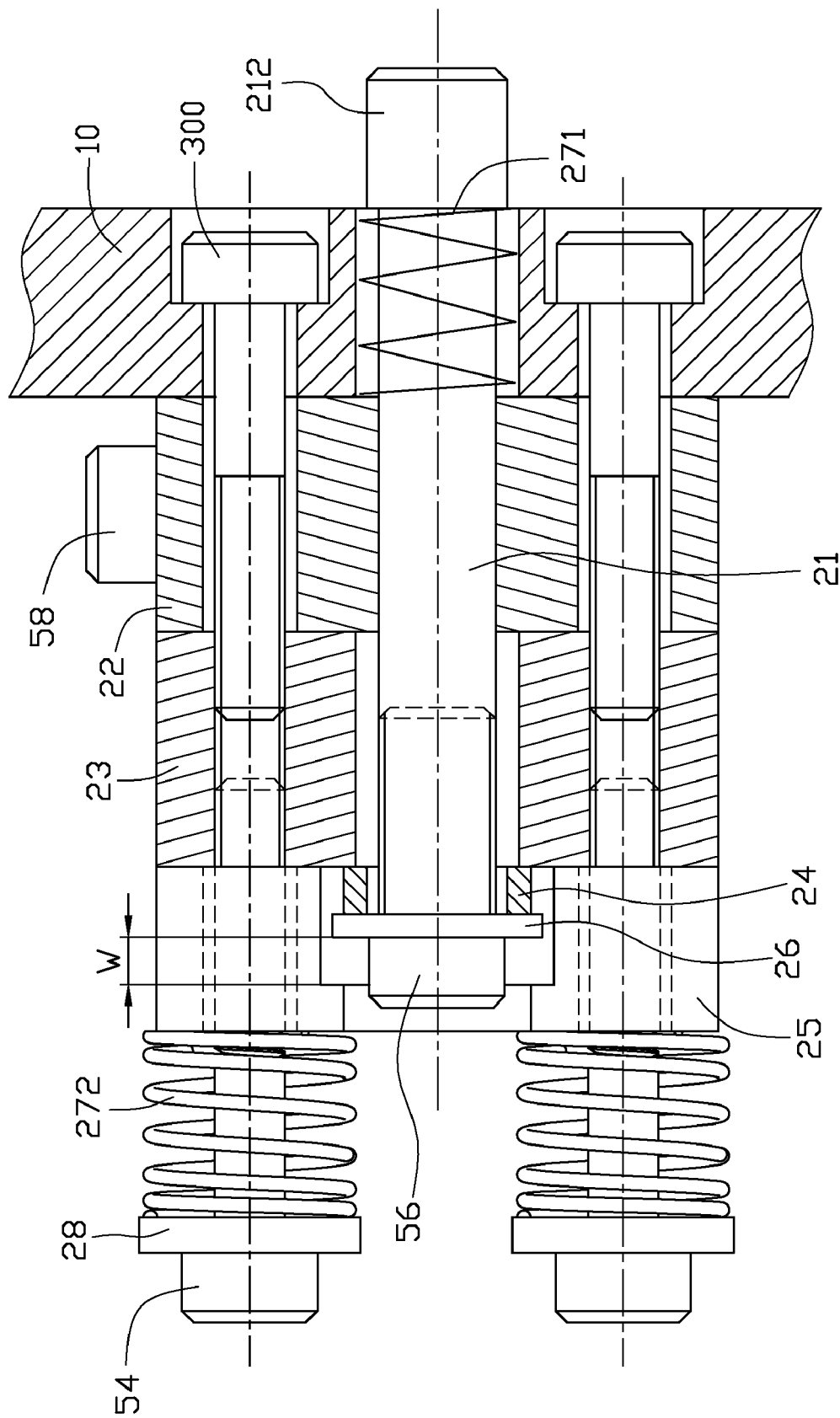
FIG. 5 is a sectional view of the testing apparatus of FIG. 4 in testing an allowable depth of the server chassis when the depth is larger than a maximum value of the depth range.

Referring also to FIGS. 4 and 5, in assembly of the testing unit 20, the first contacting member 24 is secured to the second mounting block 23 with a pair of screws 52 passing through the installing holes 244 of the first contacting member 24 and screwing in the corresponding screw holes 235 of the second mounting block 23. The spring 271 is placed around the testing pole 21. Then, the testing pole 21 successively passes through the through hole 223 of the first mounting block 22, the through hole 233 of the second mounting block 23 and the through hole 242 of the first contacting member 24. The opposite ends of the spring 271 engage with the shoulder 214 of the testing pole 21 and the first mounting block 22, respectively. The trigger member 26 is secured to the rear end of the testing pole 21 with a screw 56 passing through the installing hole 262 and screwing in the screw hole 216 of the testing pole 21. The second contacting member 25 is perpendicularly arranged to the first contacting member 24 with the through hole 252 aligned with the through hole 242. A pair of screws 54 respectively passes through the pads 28 and the springs 272. Then, the screws 54 successively pass through the installing holes 254 of the second contacting member 25 and screw in the corresponding screw holes 235 of the second mounting block 23. Thus, the second contacting member 25 is secured to the second mounting block 23. The first contacting member 24 and the second contacting member 25 are kept apart from each other with a distance W (See FIG. 5) corresponding to a tolerance of the distance L. The trigger member 26 is defined between the first and second contacting member 24, 25. A lead 32 is coupled to the screw 52. A lead 34 is coupled to the screw 54. A screw 58 screws in the screw hole 227 of the first mounting block 22, and a lead 30 is coupled to the screw 58.

Referring also to FIG. 2, to mount the testing unit 20 to the frame 10, the first mounting block 22 abuts against the inside surface of the rear wall of the frame 10 with the head 212 of the testing pole 21 passing through the through hole 14. A plurality of screws 300 correspondingly passes through the locating hole 16 of the frame 10 and the installing hole 225 of the first mounting block 22, then the screws 300 screw in the corresponding screw holes 235, thus, the testing unit 20 is secured to the rear wall of the frame 10.

In use, the frame 10 is inserted in the corresponding receiving space of the server chassis 900, and the locking portions 12 of the frame 10 are respectively locked in the locking holes 902 of the server chassis 900. The testing apparatus is powered on to apply a high voltage level to the lead 32, 34, and a low voltage level to the lead 30.

Referring also to FIG. 5, when the distance L of the server chassis 900 is larger than or equal to a maximum value of the depth range, the head 212 of the testing pole 21 doesn't abut against the corresponding connector 904. The testing pole 21 is urged by the spring 271 to make the trigger member 26 come in contact with the first contacting member 24. Thus, the lead 32 and the first contacting member 24 are electrically connected to the contacting pole 21, the first mounting block 22 and the lead 30 through the trigger member 26. The lead 32 is at a low voltage level and the lead 34 remains at a high voltage level. The signal processing member 50 collects the voltage level of the lead 32, 34 and drives the light 65 of indicating member 60 to light up, which indicates the distance L of the server chassis 900 is larger than or equal to a maximum value of the depth range. In other words, the server chassis 900 is not qualified.

Figure 6:
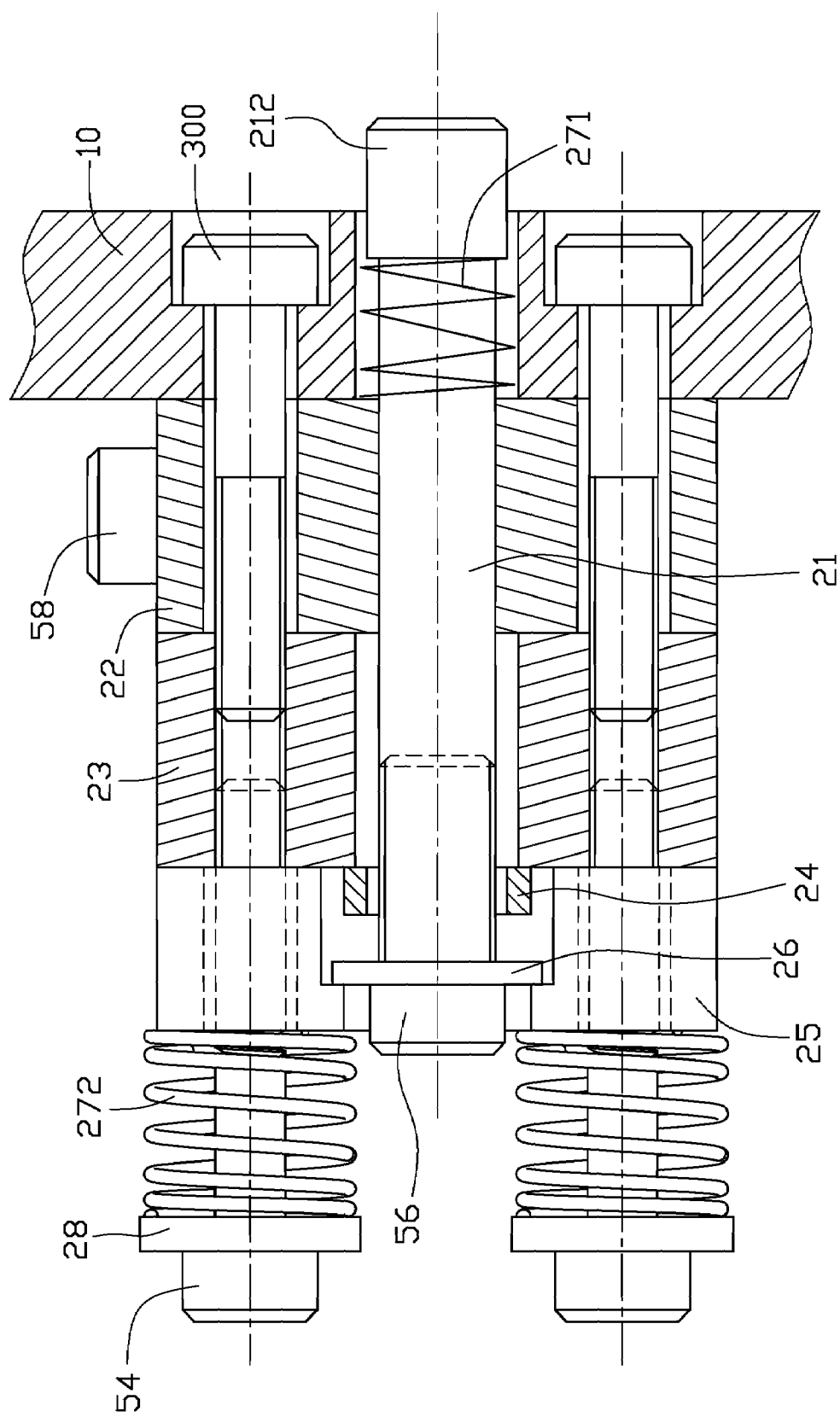
FIG. 6 is a sectional view of the testing apparatus of FIG. 4 in testing a depth of the server chassis when the depth is less than a minimum value of the allowable depth range.

Referring also to FIG. 6, when the distance L of the server chassis 900 is less than or equal to a minimum value of the depth range, the head 212 of the testing pole 21 abuts against the corresponding connector 904 and the testing pole 21 is urged to make the trigger member 26 come in contact with the second contacting member 25. Thus, the lead 34 and the second contacting member 25 are electrically connected to the contacting pole 21, the first mounting block 22 and the lead 30 through the trigger member 26. The lead 34 is at a low voltage level and the lead 32 remains at a high voltage level. The signal processing member 50 collects the voltage level of the lead 32, 34 and drives the light 66 of indicating member 60 to light up to indicate the distance L of the server chassis 900 is less than or equal to a minimum value of the depth range. In other words, the server chassis 900 is not qualified. When the distance L is too short, the spring 272 can be compressed to cushion against the second contacting member 25 from being destroyed by excessive striking.

Figure 7:
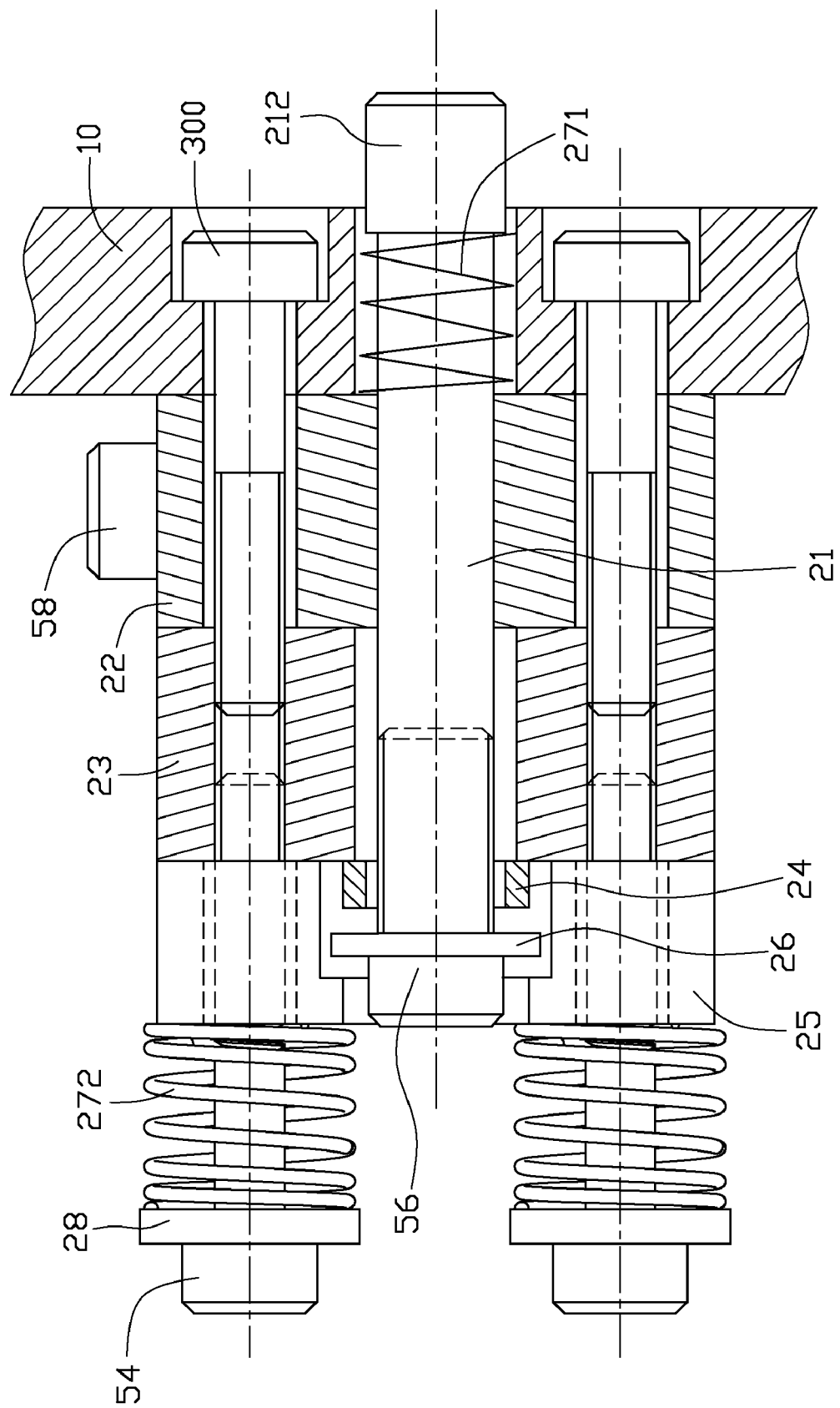
FIG. 7 is a sectional view of the testing apparatus of FIG. 4 in testing a depth of the server chassis when the depth is between the allowable depth range.

Referring also to FIG. 7, when the distance L of the server chassis 900 is between the maximum value and the minimum value of the depth range, the head 212 of the testing pole 21 abuts against the corresponding connector 904 and the testing pole 21 is urged to make the trigger member 26 come in contact with neither the first contacting member 24 nor the second contacting member 25. The leads 32 and 34 both remain at a high voltage level. The signal processing member 50 collects the voltage level of the lead 32, 34 and drives the light 67 of indicating member 60 to light up to indicate the distance L of the server chassis 900 is between the depth range. In other words, the server chassis 900 is qualified.

The testing apparatus can be used not only for testing the depth of the server chassis 900, but also for checking other objects that have distance or length to be tested. The indicating member 60 can indicate not only with lights 65, 66 and 67, but also with other indicating devices such as buzzers or displays.

It is believed that the present embodiment and their advantage will be understood from the foregoing description, and it will be apparent that various changes may be made thereto without departing from the spirit and scope of the invention or sacrificing all of its material advantages, the example hereinbefore described merely being exemplary embodiment of the invention.

What is claimed is:

1. A testing apparatus for testing whether a depth of a server chassis is in a desired depth range or not, a plurality of receiving spaces defined in the server chassis, the testing apparatus capable of being received in corresponding receiving space of the server chassis and comprising:
    a testing frame configured for being received and secured in the server chassis;
    a testing unit mounted on the frame, the test unit comprising a testing pole telescopingly retained in a rear wall of the frame, a pair of first and second contacting members spaced apart with a distance in accordance with the desired depth range, and a trigger member secured to the testing pole and moving with the testing pole to come in contact with the first or second contacting members or neither of them;
    a signal processing member mounted on the frame and electrically connected to the test unit for sending a signal based on connection status between trigger member and the contact poles when the frame is secured in the server chassis; and
    an indicating member mounted on the frame and electrically connected to the signal processing member to indicate the testing result according to the signal.

2. The testing apparatus as described in claim 1, wherein the testing unit further comprises a first mounting block secured to the frame and a spring placed around the first mounting block, the testing pole defines a head with a shoulder formed at a rear end of the shoulder, opposite ends of the spring engage with the shoulder of the testing pole and the first mounting block, respectively.

3. The testing apparatus as described in claim 2, wherein the testing unit further comprises a second dielectric mounting block secured to the first mounting block and configured for the contacting members fixed thereon.

4. The testing apparatus as described in claim 3, wherein the second contacting member includes a contacting portion and a pair of locating portions respectively protruding from opposite ends of the contacting portion secured to the second mounting block, the first and second contacting member are perpendicularly arranged and the locating portions are positioned at opposite sides of the first contacting member, the trigger member moves between the first contacting member and the contacting portion of the second contacting member.

5. The testing apparatus as described in claim 2, wherein the first and second contacting members are applied a high voltage level through leads correspondingly electrically connected therewith, the first mounting block is applied a low voltage level through a lead correspondingly electrically connected therewith.

6. The testing apparatus as described in claim 5, wherein the signal processing member collects the voltage statuses of the first and second contacting members and sends a signal to drive the indicating member to indicate whether the depth of the server chassis is larger than or equal to a maximum value of the depth range when the trigger member contacts the first contacting member, or indicate whether the depth of the server chassis is less than or equal to a minimum value of the depth range when the trigger member contacts the second contacting member.

7. The testing apparatus as described in claim 4, wherein a shock absorbing member is arranged at a side of the second contacting member opposite to the first contacting member.

8. The testing apparatus as described in claim 6, wherein the indicating member comprises three lights emitting three different lights correspondingly for indicating the trigger member contacting with only the first contacting member, only the second member, or neither of them.

* * * * *